Jan. 25, 1955  E. ACKERLIND  2,700,634
METHOD OF LAMINATING A CELLULAR CORE SANDWICH
Filed Sept. 9, 1949  2 Sheets-Sheet 1
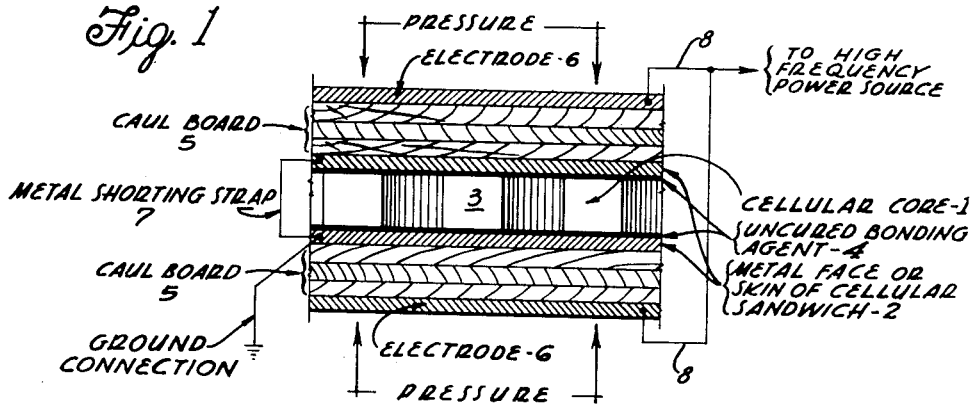
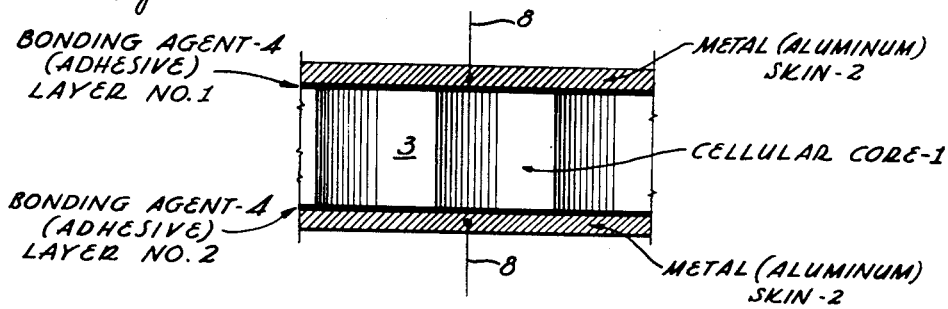
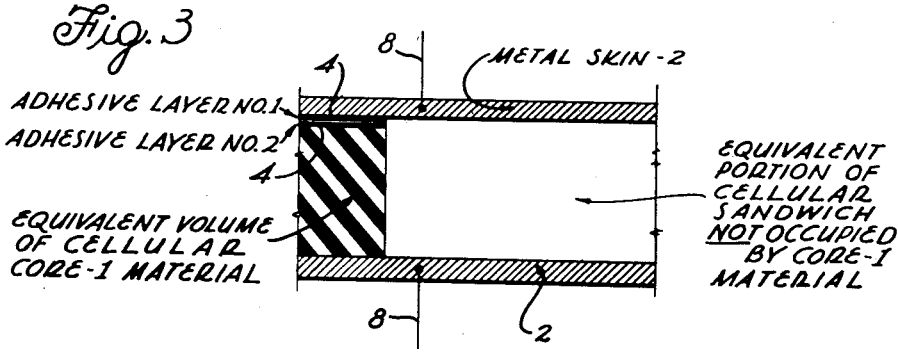
INVENTOR.
ERIK ACKERLIND
BY
Herbert E. Metcalf
ATTORNEY Jan. 25, 1955 E. ACKERLIND 2,700,634
METHOD OF LAMINATING A CELLULAR CORE SANDWICH
Filed Sept. 9, 1949 2 Sheets-Sheet 2

INVENTOR.
ERIK ACKERLIND
BY
Herbert E. Metcalf
ATTORNEY

United States Patent Office 2,700,634
Patented Jan. 25, 1955

2,700,634

METHOD OF LAMINATING A CELLULAR CORE SANDWICH

Erik Ackerlind, Redondo Beach, Calif., assignor to Northrop Aircraft, Inc., Hawthorne, Calif., a corporation of California Application September 9, 1949, Serial No. 114,729

3 Claims. (Cl. 154—126.5)

My invention relates to a means and method for fabrication of cellular core sandwiches, and more particularly to a means and method of fabricating such sandwiches by the use of dielectric heating.

For the purposes of this specification, a cellular core sandwich is defined as being a structure having a multicellular core, usually of non-metallic material, the ends of the core cells being open. The sandwich is formed by applying skin sheets, usually (but not necessarily) metal, to the core to cover the open ends of the core cells, with adhesive therebetween. Heat and pressure is applied to the skin sheets until the adhesive has curved. As the cell cross section is usually hexagonal, the term honeycomb core sandwich is often used to describe this type of construction.

Recent attempts to use dielectric heating for the bonding of metal skin sheets to a cellular core have been, as far as is presently known, unsuccessful except by the use of caul boards in contact with the skin sheets. A caul board (usually of plywood) is merely a means of converting high frequency electric power to heat which is then applied by conduction transfer to the adjacent skin sheet, and through the skin sheet to the adhesive. This method is inefficient, requires a high frequency generator of large capacity, and is not readily adapted to the fabrication of sandwich panels having curved skins or faces. It is an object of the present invention to provide a means and method of dielectrically heating cellular core sandwiches without the use of caul boards.

I have determined that the lack of success in the use of dielectric heating of cellular core sandwiches without the use of caul boards is due to two factors:

1. The high thermal conductivity and high specific heat of the metal skins in contact with the adhesive, and:

2. The low thermal conductivity and low specific heat of the core materials used, such as resin impregnated cloth, for example.

Because of the first of these two factors, the heat is absorbed, as well as conducted away, in the metal skin at a sufficiently high rate to prevent proper curing of the adhesive before charring of the core material occurs. This charring is increased due to the fact that although the dielectric properties of the core material and adhesive are somewhat similar, the heat generated in the core cannot be quickly removed because of the low thermal conductivity of the core material.

Thus, the second factor is that although the number of B. t. u.'s absorbed by the core is small, the low specific heat of the core material causes its temperature to increase and charring occurs.

It is a further object of the present invention to so modify the material of a cellular core that it can be satisfactorily used in a cellular core sandwich that can be fabricated by dielectric heating.

It is another object of the present invention to provide a cellular core sandwich construction that can be satisfactorily fabricated by dielectric heating, whether the skin sheets of the sandwiches are of metallic, or non-metallic material.

Briefly, the present invention in one aspect provides for the treatment of the core material to be used for a cellular core in a cellular core sandwich, with a conducting filler or coating to reduce the resistivity of the core material. In addition, particularly when metallic or conducting skins are utilized in the sandwich, an insulating layer is positioned between the skin sheets and the core material. The net result of the use of the invention disclosed herein, is that cellular core sandwiches can be satisfactorily fabricated by the use of dielectric heating, using either conducting or non-conducting skin sheets, without the use of caul boards.

The above and other objects and advantages will be more apparent by reference to the following description of the appended drawing in which:

Figure 1 is a diagrammatic cross-section of a set-up for fabricating a cellular core sandwich by the use of caul boards.

Figure 2 is a diagrammatic cross-section of a commonly used form of cellular core sandwich.

Figure 3 is a diagram representing the electrical equivalent of the sandwich of Figure 2.

Figure 4:
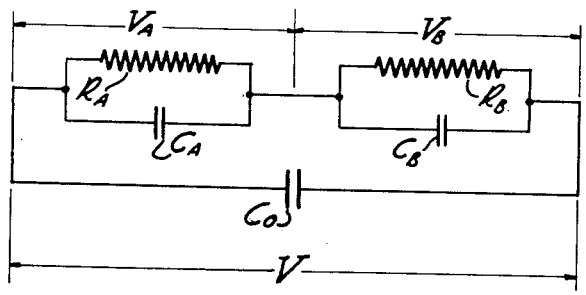
Figure 4 is a wiring diagram of an electrical circuit utilized to explain the theory involved in the dielectric heating of cellular core sandwiches.

In all of the figures, the relative thicknesses of the various parts have been exaggerated for clarity of explanation.

In using dielectric heating at the present time for the fabrication of cellular core sandwiches, a caul board method is utilized, as shown in Figure 1.

Here a honeycomb core 1 is held with a skin sheet 2 of metal on each side of the core 1, to close the open ends of the individual cells 3, of the core, and a layer 4 of bonding adhesive is placed between the edges of the cells 3 and the inner surfaces of the skin sheets 2.

Over each skin sheet 2 is placed a removable caul board 5 usually of ¾₆" plywood. Metal electrodes 6 are then placed over each of the caul boards. The two skin sheets 2 are connected together by a shorting strap 7 and grounded, and an A. C. high frequency source (not shown) is connected to each metal electrode 6 through leads 8. Power at high frequency is then applied to the assembly to heat the caul boards and to cure the adhesive layers 4. No conversion of electric power to heat occurs within the sandwich itself, because of the zero voltage gradient therethrough. Since the heat is generated only in the caul board, and is transmitted to the bonding layers by conduction only, this method is manifestly inefficient. After curing has taken place the electrodes 6 and the caul boards 5 are removed, leaving the sandwich as shown in Figure 2. Obviously this figure can also represent the sandwich structure prior to heating; the only difference being the condition of the adhesive layers 4.

From the view point of electrical theory, the configuration of the panel of Figure 2 can be redrawn as shown in Figure 3, where the two adhesive layers 4 are placed together, with the solid portion of the core lumped between the adhesive layers and the opposite skin 2, with the open spaces of the core lumped between the two skins 2.

The equivalent electrical circuit of the configuration of Figure 3 is shown in Figure 4. The components shown are defined as follows:

$R_A$=parallel resistance of both adhesive layers 4.
$C_A$=parallel capacity of both adhesive layers 4.
$B_B$=parallel resistance of honeycomb core 1.
$C_B$=parallel capacity of honeycomb core 1.
$C_0$=capacity of condenser formed by the sandwich skins 2, and equivalent space not occupied by core material.
$V$=alternating voltage across sandwich.
$V_A$=alternating voltage across both adhesive layers 4.
$V_B$=alternating voltage across honeycomb core 1.

From electric circuit theory, it can be shown that the electric power dissipate (and hence heat generated) in the adhesive layers 4 will be:

$$P_A = \cfrac{V^2 R_A}{(1+\omega^2 C_A^2 R_A^2)\left[\left\{\cfrac{R_A}{1+\omega^2 C_A^2 R_A^2}+\cfrac{R_B}{1+\omega^2 C_B^2 R_B^2}\right\}^2 + \left\{\cfrac{\omega C_A R_A^2}{1+\omega^2 C_A^2 R_A^2}+\cfrac{\omega C_B R_B^2}{1+\omega^2 C_B^2 R_B^2}\right\}^2\right]}$$

where $\omega = 2\pi f$; $f$ being the frequency of the applied alternating voltage. In like manner, the power dissipated in the core material will be:

$$P_B = \cfrac{V^2 R_B}{(1+\omega^2 C_B^2 R_B^2)\left[\left\{\cfrac{R_A}{1+\omega^2 C_A^2 R_A^2}+\cfrac{R_B}{1+\omega^2 C_B^2 R_B^2}\right\}^2 + \left\{\cfrac{\omega C_A R_A^2}{1+\omega^2 C_A^2 R_A^2}+\cfrac{\omega C_B R_B^2}{1+\omega^2 C_B^2 R_B^2}\right\}^2\right]}$$

The ratio of the power dissipated in the adhesive to the power dissipated in the honeycomb core is:

$$\frac{P_A}{P_B} = \frac{R_A(1+\omega^2 C_B^2 R_B^2)}{R_B(1+\omega^2 C_A^2 R_A^2)}$$

Assuming that the dielectric properties of the adhesive cannot be varied at will, then:

$$\frac{P_B}{P_A} = K \cdot \frac{R_B}{1+\omega^2 C_B^2 R_B^2}$$

where $K$ is a constant. From an examination of this expression, it will be seen that the following relations will hold:

$$\frac{P_B}{P_A} \to 0 \text{ when } R_B \to 0$$

$$\frac{P_B}{P_A} \to 0 \text{ when } R_B \to \infty$$

$$\frac{P_B}{P_A} \to 0 \text{ when } C_B \to \infty$$

The first of these conditions indicates that if the core 1 were of zero resistance (or infinite conductivity), no heat would be generated because of the zero voltage gradient. This fact leads to the use of a honeycomb sandwich configuration for the case of a conducting face material, such as aluminum sheet 2, as shown in Figure 5, and to a configuration of a non-conducting face material 2a, such as glass-cloth, as shown in Figure 6.

Figure 5:
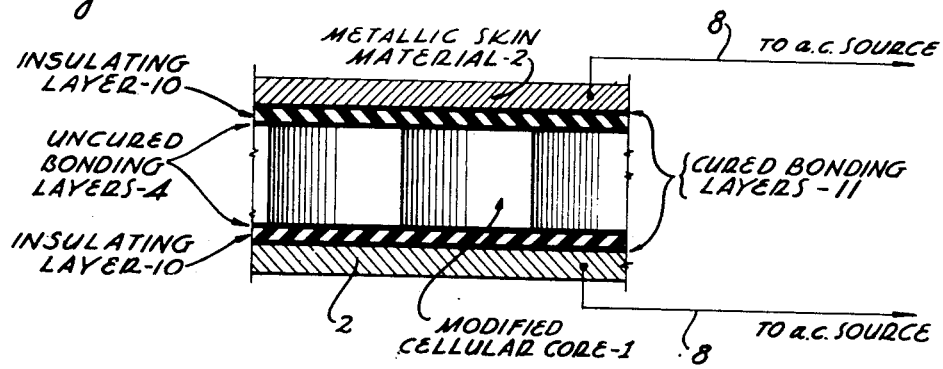
Figure 5 is a diagrammatic cross-section of a cellular core sandwich illustrating one preferred form of the present invention as applied to a sandwich having metal skins.
Figure 6:
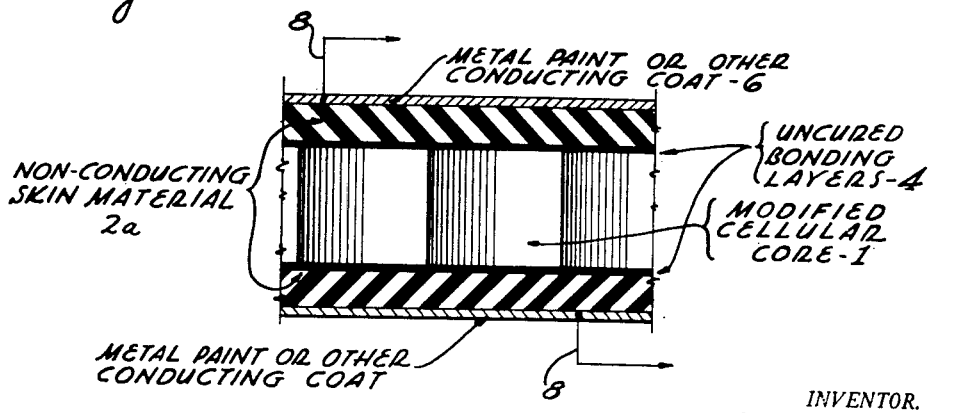
Figure 6 is a diagrammatic cross-section of a cellular core sandwich illustrating a form of the invention as applied to a sandwich having non-metallic skins.

Referring to Figure 5, a honeycomb core sandwich is shown well adapted for dielectric heating without the use of caul boards.

First, the core 1 is treated to decrease its resistivity. This is done by spraying or otherwise coating the core material with a metallic conducting paint, or with a carbon base paint, for example, after the cores are fabricated. Or, if desired, the basic core sheets, usually of cloth or paper, can be impregnated with a conducting filler such as finely divided carbon, for example, as they are being impregnated with resin, or other stiffening agent. Carbon is also well suited for incorporation in cellulose acetate, hard rubber, and similar core materials. In any event, the core material is made to be semi-conductive.

Second, when metal skin sheets 2 are utilized, a layer 10 of insulating material is placed between the core 1 and each skin sheet 2. In this case, an additional layer 11 of adhesive may be positioned between the insulating layers 10 and the skin sheets 2. These insulating layers 10 may be, for example, about 1/64" in thickness and obtained, for example, by spraying or otherwise applying an insulating compound to the inside surfaces of the metal skin sheets. If the insulating compound has bonding qualities of itself, no second layer 11 of adhesive will be needed. However, I may prefer to form the insulating layers 10 of resin impregnated kraft paper, or resin impregnated cotton cloth, for example, in which case the layer 11 of adhesive is used, and the paper or cloth is bonded to skin sheets 2 prior to assembly. Any material with the requisite strength, low conductivity and preferably (but not necessarily) high dielectric constant, can be utilized for the layers 10. A high dielectric constant is desirable since the voltage drops across the insulating layers are thereby reduced, thus reducing possibility of electrical failure of material as well as reducing the magnitude of the voltage required to be supplied by the A. C. generator (with resulting reduction in A. C. generator cost).

In fabricating a metal skin sandwich of the type shown in Figure 5, one mode of procedure is as follows:

A. The skin sheets 2 are shaped to obtain the desired curvature.

B. The inside surfaces of the metal skins 2 are coated with insulating layers 10. In the case where paper or cloth layers are used, the material should preferably be pre-bonded to the metal surface by a suitable adhesive thereby forming cured adhesive layers 11.

C. The insulating layers, 10 (or the edges of the cellular core) are coated with adhesive (adhesive layers 4).

D. The skin sheets 2 are pressed against the opposite edges of the core 1 with the insulating layers 10 adjacent the core.

E. An alternating voltage is then applied to the metal skin sheets through leads 8 to supply dielectric heating power to cure adhesive layers 4.

In the case of a honeycomb core sandwich having non-conducting skin sheets 2a, as shown in Figure 6, there will be no need of an extra insulating layer 10 between the adhesive layer 4 and the skin sheets, as the skin sheets themselves in this case are non-conducting, being made, for example, of impregnated glass cloth or the like. However, temporary electrodes 6 of metal (such as lead foil) may be applied over the non-conducting skin sheets or, as preferred, a layer of conducting paint is applied to the exterior surfaces of the non-conducting skin sheets 2a, to form electrodes 6. The best type of material for the non-conducting skin sheets is a material of low conductivity and preferably (but not necessarily), high dielectric constant, as such a material minimizes heating of the skin sheet material. A high dielectric constant is desirable for reducing voltage drop across the material, for the reasons given in connection with insulating layer 10.

With the exception of the different skin sheet construction, the procedure for fabricating sandwiches having non-conducting skin sheets is substantially the same as that used to fabricate sandwiches having metal skin sheets, and in both cases the cellular core is treated to make it of low resistivity, to prevent charring.

It will be noted that in both examples given, i. e., when the skin sheets are either conductive or non-conductive, there is an insulating barrier between the core and the conductors used as electrodes. Thus the insulating layers 10 (Figure 5) and the skin sheets 2a (Figure 6) act as both thermal and electrical insulators. As thermal insulators, they reduce the amount of heat conducted away from the heat generated in the adhesive layers 4 by the applied alternating voltage. Also, these non-conducting layers prevent the establishment of conducting paths between the core material, and the conducting electrodes. If these conducting paths were to be established, the voltage gradients across the adhesive layers 4 would become zero or would be greatly reduced.

When sandwiches having contours other than flat are to be fabricated, pressure can conveniently be applied to the skin sheets 2 or 2a during dielectric heating by the use of the method shown, described, and claimed in my companion application filed September 9, 1949, Serial No. 114,730. In essence, this latter method includes forming passageways connecting the cells of the core, sealing the edges of the sandwich, and evacuating the core to place atmospheric pressure on the skin sheets. In this way, no pressure dies are required.

From the above description, it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. In the method of fabricating a cellular core sandwich comprising a core of non-conductive material susceptible to charring when subjected to excessive heating, and which is bonded to skin sheets by a layer of a thermosetting adhesive, which adhesive is activated by dielectric heat generated by a high frequency electric field, the improvement of inhibiting charring of the core during the bonding operation which consists in impregnating said non-conductive core with conductive material whereby excessive heating thereof is precluded.

2. A method according to claim 1, wherein the skins are of non-conductive material and the adhesive layer is in direct contact therewith.

3. Method according to claim 1, wherein the skins are of conductive material and a layer of non-conductive material is interposed between the skins and the adhesive layer.

References Cited in the file of this patent

UNITED STATES PATENTS

| | | |
|---|---|---|
| 2,056,563 | Budd et al. | Oct. 6, 1936 |
| 2,291,140 | Bowyer | July 28, 1942 |
| 2,304,718 | Swart | Dec. 8, 1942 |
| 2,376,653 | Boyer | May 22, 1945 |
| 2,393,541 | Kohler | Jan. 22, 1946 |
| 2,423,902 | Peterson | July 15, 1947 |
| 2,428,979 | May | Oct. 14, 1947 |
| 2,434,573 | Mann et al. | Jan. 13, 1948 |
| 2,439,918 | Auxier et al. | Apr. 20, 1948 |
| 2,512,875 | Reynolds | June 27, 1950 |

FOREIGN PATENTS

| | | |
|---|---|---|
| 567,380 | Great Britain | Feb. 12, 1945 |
| 577,790 | Great Britain | May 31, 1946 |